United States Patent

Busboom

[11] Patent Number: 5,797,251
[45] Date of Patent: Aug. 25, 1998

[54] BLADE DRIVE CLUTCH AND BRAKE FOR A LAWN MOWER

[75] Inventor: Garry W. Busboom, Beatrice, Nebr.

[73] Assignee: ExMark Mfg. Co., Inc., Beatrice, Nebr.

[21] Appl. No.: 806,427

[22] Filed: Feb. 26, 1997

[51] Int. Cl.⁶ .................................................. A01D 69/08
[52] U.S. Cl. ................... 56/11.3; 56/11.6; 56/11.8; 56/16.9; 56/DIG. 6; 192/11
[58] Field of Search ................... 56/11.3, 11.5, 56/11.6, 11.7, 11.8, 12.6, 16.9, DIG. 4, DIG. 6, 16.7; 192/11

[56] References Cited

U.S. PATENT DOCUMENTS

| | | | |
|---|---|---|---|
| 3,583,535 | 6/1971 | Plamper | 192/11 |
| 3,590,564 | 7/1971 | Clifford | 56/11.6 X |
| 3,628,315 | 12/1971 | Bartholomew | 56/11.6 X |
| 3,795,094 | 3/1974 | Mollen et al. | 56/11.6 X |
| 4,787,195 | 11/1988 | Wenzel | 56/11.1 |
| 4,920,734 | 5/1990 | Wenzel | 56/11.1 |
| 4,941,864 | 7/1990 | Bottum | 474/133 |
| 4,958,484 | 9/1990 | Busboom | 56/255 |
| 4,967,543 | 11/1990 | Scag et al. | 56/10.8 |
| 4,977,732 | 12/1990 | Minter | 56/11.6 |
| 5,077,959 | 1/1992 | Wenzel | 56/11.1 |
| 5,127,215 | 7/1992 | Wenzel | 56/11.1 |
| 5,129,217 | 7/1992 | Loehr | 56/13.6 |
| 5,145,019 | 9/1992 | Sebben et al. | 56/11.3 X |
| 5,155,985 | 10/1992 | Oshima et al. | 56/10.8 |
| 5,239,810 | 8/1993 | Gugel | 56/10.8 |
| 5,249,411 | 10/1993 | Hake | 56/11.6 |
| 5,251,429 | 10/1993 | Minato et al. | 56/17.2 |
| 5,337,543 | 8/1994 | Kitamura et al. | 56/10.8 |
| 5,355,661 | 10/1994 | Tomiyama | 56/10.8 |
| 5,361,566 | 11/1994 | Hohnl | 56/11.6 |
| 5,367,861 | 11/1994 | Murakawa et al. | 56/11.8 |
| 5,518,079 | 5/1996 | Zvolanek | 180/19.1 |

*Primary Examiner*—Heather Shackelford
*Attorney, Agent, or Firm*—Zarley, McKee, Thomte, Voorhees & Sease; Dennis L. Thomte

[57] ABSTRACT

A blade drive clutch and brake for a lawn mower including an engine having a drive shaft extending downwardly therefrom and which has a drive sheave thereon. A clutch arm is movably mounted below and rearwardly of the engine drive shaft sheave and supports a vertically disposed, rotatable jackshaft thereon. An upper sheave is mounted on the upper end of the jackshaft and is connected to the engine drive shaft sheave by an upper belt. A lower sheave is mounted on the lower end of the jackshaft and has a drive belt extending therearound which is connected to the sheaves on the cutting blades located in the mower deck. A lever is connected to the clutch arm for moving the clutch arm between engaged and disengaged positions. When the clutch arm is in its disengaged position, the blade drive belt pulls the clutch arm and jackshaft forwardly so that the upper belt is in a non-driving position. When the clutch arm is moved to its engaged position, the upper belt is placed in a driving condition so that the cutting blades will be rotated. A brake drum is mounted on the lower end of the jackshaft and is moved into frictional engagement with a stationary brake band when the clutch arm is moved to its disengaged position so that the rotation of the cutting blades will be slowed.

5 Claims, 6 Drawing Sheets

BLADE DRIVE CLUTCH AND BRAKE FOR A LAWN MOWER

BACKGROUND OF THE INVENTION

1. Field of the Invention

This invention relates to a mechanical means for engaging and disengaging the cutting blades on a lawn mower and which may also include a brake for decreasing the blade stopping time.

2. Description of the Related Art

A vast majority of prior art lawn mowers which employ a plurality of cutting blades positioned in a mower deck located forwardly of the mower engine utilize some sort of belt drive which interconnects the drive sheave on the engine to the cutting blade sheaves. One prior art method of providing such a connection is to provide an electric or a mechanical clutch which is attached to the engine drive shaft. A belt usually runs directly from the mechanical or electrical clutch to the mower deck drive sheaves. A second method of connecting the engine sheave to the mower deck drive sheaves is by a clutching belt arrangement including a belt tensioning idler. The drive system of this type of prior art device is disengaged by relaxing the tension on the belt. Such a system is not normally used when the front mower deck floats vertically relatively to the rear engine frame, since this motion may cause the belt to either come off the drive sheaves and idlers or to engage, causing the blades to rotate, when it is in the disengaged mode.

SUMMARY OF THE INVENTION

A blade drive clutch and brake for a self-propelled lawn mower is described wherein the lawn mower includes a frame having an engine deck at the rearward end thereof and a mower deck at the forward end thereof with the mower deck housing a blade assembly containing one or more movable cutting blades. An engine is mounted on the engine frame and has a vertically disposed rotatable drive shaft or crank shaft extending downwardly therefrom. A pump drive pulley is mounted on the engine drive shaft for driving the hydraulic pumps which drive the drive wheels of the lawn mower. A drive sheave or pulley is mounted on the engine drive shaft and is adapted to have an upper belt extending therearound. A horizontally disposed, elongated clutch arm is positioned rearwardly of the engine and which is located below the drive sheave on the engine drive shaft. The clutch arm is pivotally connected, about a vertical axis, to the engine frame at one side thereof and extends toward the other side of the engine frame. The clutch arm is selectively pivotally movable from a first forward position to a second rearward position, and is moved between those positions by a manually operated control operatively connected thereto. A vertically disposed, rotatable jackshaft is mounted on the clutch arm between the ends thereof and has upper and lower ends. An upper sheave is mounted on the upper end of the jackshaft and a lower sheave is mounted on the lower end of the jackshaft. The upper belt extends around and connects the drive sheave and the upper sheave with the upper belt normally extending loosely around the drive sheave and the upper sheave in a non-driving relationship when the clutch arm is in its first forward position. A blade drive belt extends around and connects the lower sheave on the jackshaft and sheaves on the cutting blades. A spring-loaded idler sheave is in engagement with the blade drive belt for tensioning the blade drive belt so that the tension in the blade drive belt will yieldably urge the lower sheave forwardly and will yieldably urge the clutch arm forwardly towards its first forward position. A manually operated control linkage is provided for selectively moving the clutch arm from its first forward position to its second rearward position, thereby moving the jackshaft and the upper and lower sheaves rearwardly, with respect to the engine frame, so that the upper belt is brought into frictional driving engagement with the drive sheave and the top sheave to cause the lower sheave to drive the blade drive belt and the cutting blades.

It is a principal object of the invention to provide an improved blade drive clutch for a lawn mower.

Still another object of the invention is to provide a blade drive clutch and brake for a lawn mower.

Still another object of the invention is to provide a blade drive clutch for a lawn mower which is more economical, more reliable and more durable than the prior art devices.

Still another object of the invention is to provide a blade drive clutch for a lawn mower which is ideally suited for use with a mower deck having the capability of vertically moving or floating with respect to the engine frame.

These and other objects will be apparent to those skilled in the art.

DESCRIPTION OF THE PREFERRED EMBODIMENT

Figure 1:
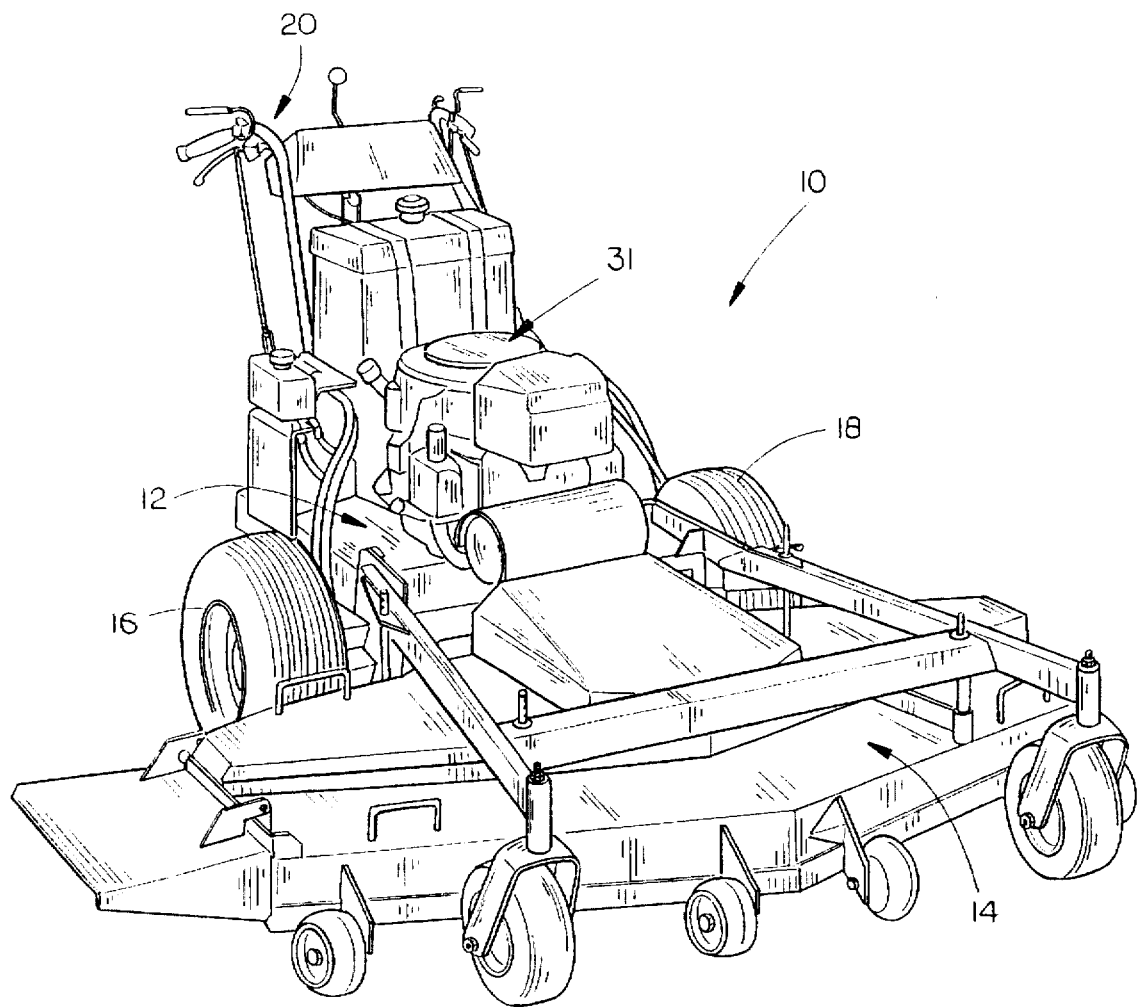
FIG. 1 is a front perspective view of a three-bladed mower of this invention.
Figure 2:
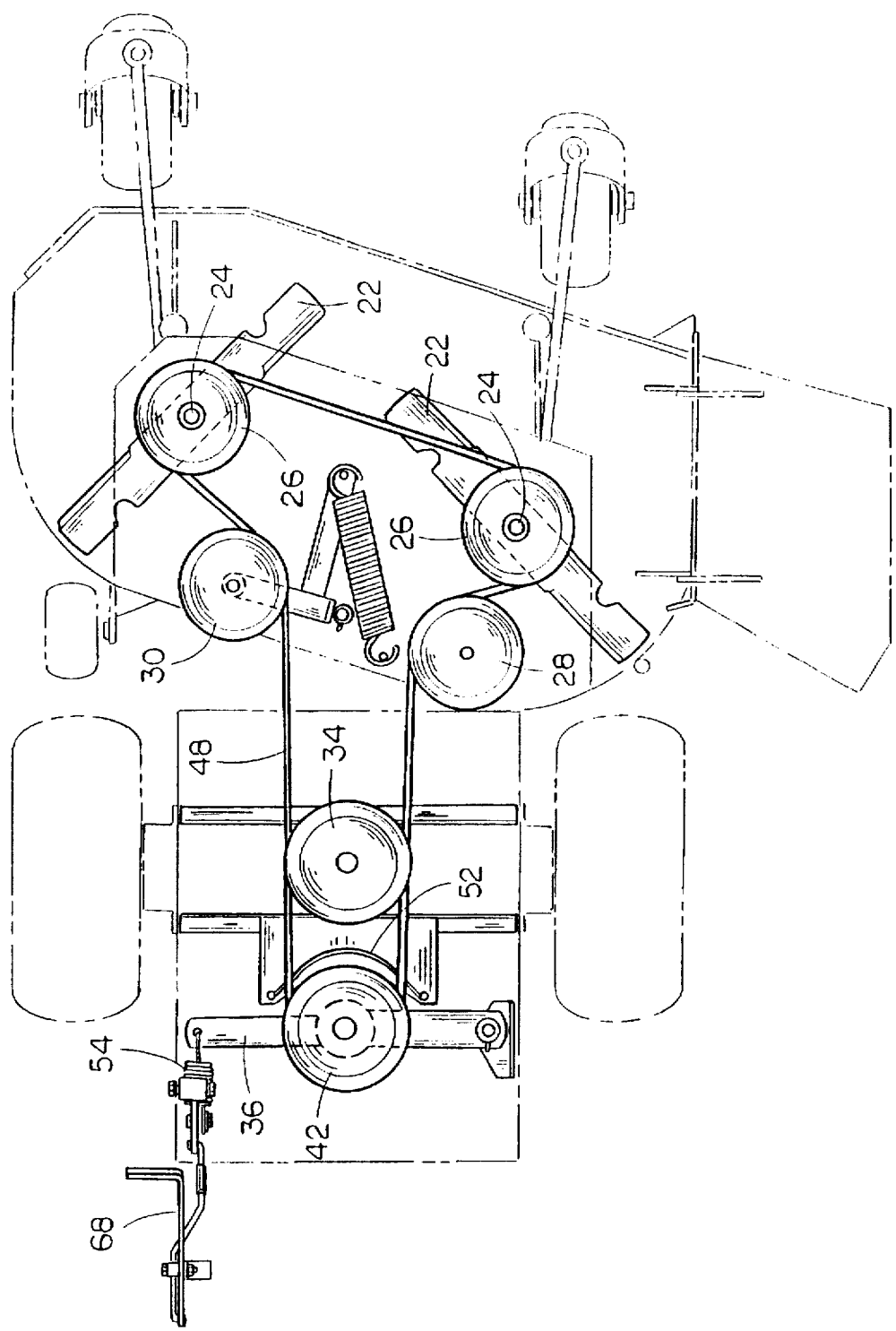
FIG. 2 is a top elevational view of a two-bladed mower of this invention.
Figure 3:
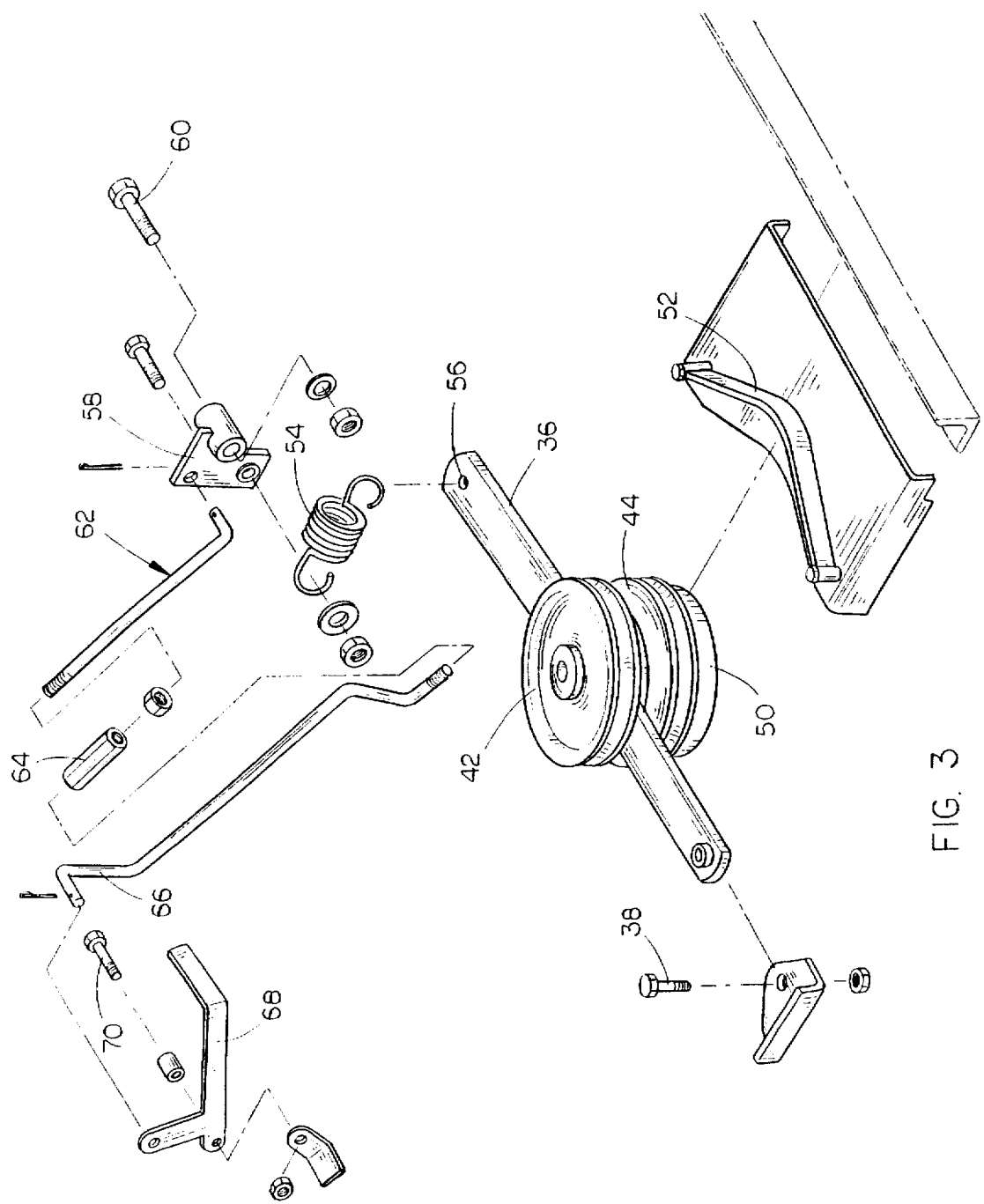
FIG. 3 is a partial perspective view of the invention.

The numeral 10 refers generally to a self-propelled lawn mower including an engine frame 12 having a mower deck 14 positioned forwardly thereof. A pair of drive wheels 16 and 18 are positioned at the opposite sides of the engine frame 12 for driving and steering the lawn mower. The numeral 20 refers to a handle assembly which extends upwardly and rearwardly from the engine frame 12 in conventional fashion and which has the required steering controls, speed control, etc., positioned thereon. Mower deck 14 houses a plurality of cutting blades 22 provided thereon having vertically disposed spindles 24 extending upwardly therefrom and which have pulleys or sheaves 26 mounted thereon. Deck 14 may include one blade, two blades or three blades, as desired. Mower deck 14 also includes an idler sheave 28 and a spring-tensioned idler sheave 30, as will be described in more detail hereinafter.

Figure 5:
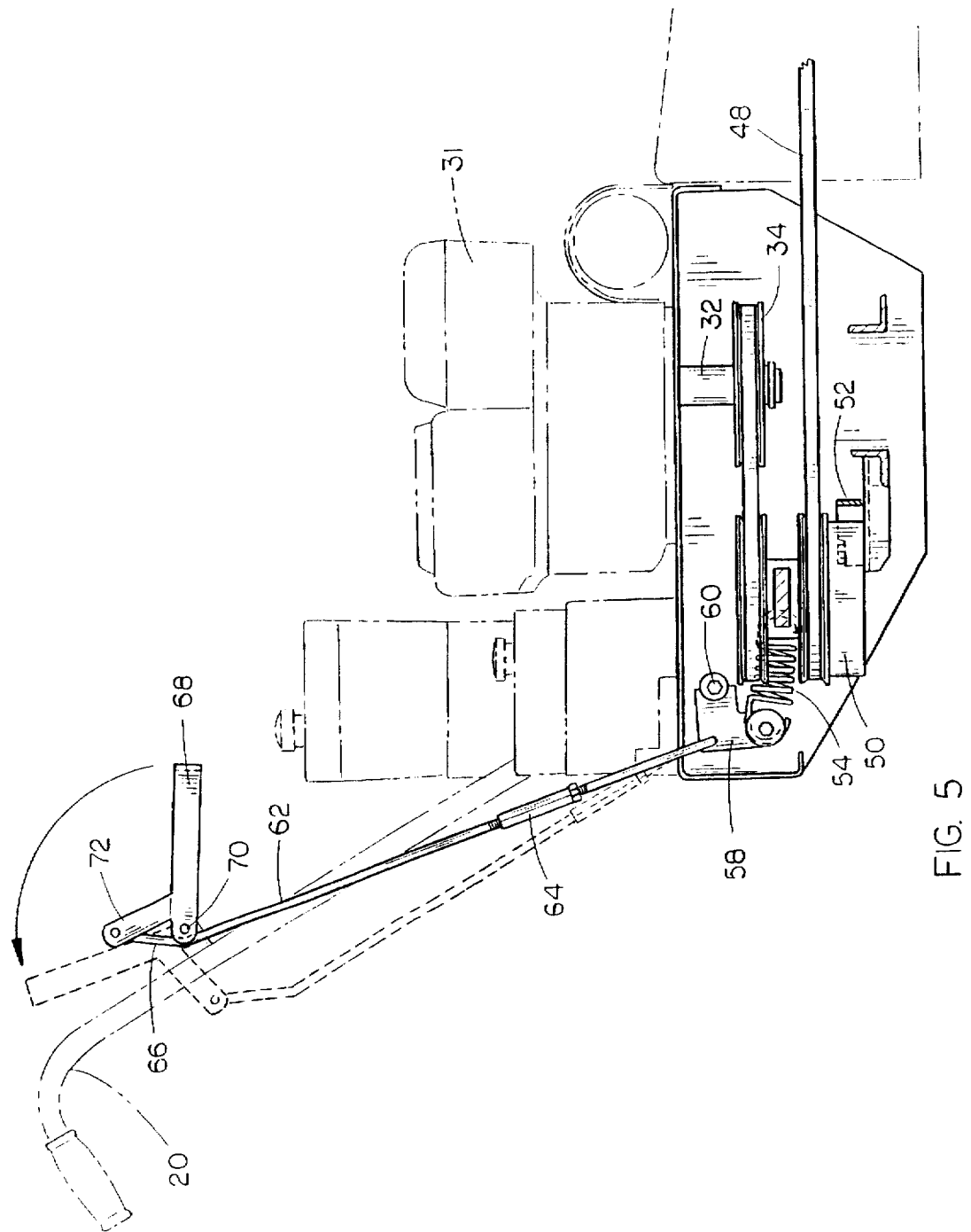
FIG. 5 is a partial side elevational view of the invention.

Engine 31 is mounted on engine frame 12 and includes a vertically disposed crank shaft or drive shaft 32 which extends downwardly therefrom and which has a drive sheave 34 mounted on the lower end thereof. Drive shaft 32 would also have a pulley mounted thereon (not shown) for driving the hydraulic pumps which drive the wheel motors for the drive wheels. The numeral 36 refers to an elongated clutch arm which is positioned rearwardly of engine 31 and which is positioned below drive sheave 34, as been seen in FIG. 5.

Figure 7:
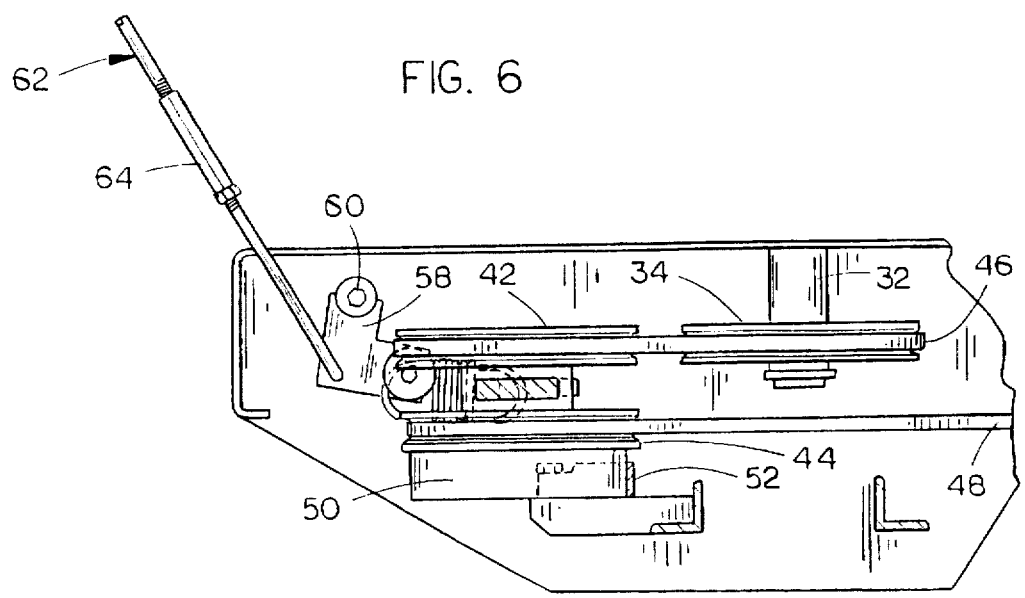
FIG. 7 is a side view of the apparatus of FIG. 6.

Clutch arm 36 is substantially horizontally disposed and has one end pivotally connected to engine frame 12, at one side thereof, by means of pivot bolt 38. Vertically disposed jackshaft 40 is mounted on the clutch arm, intermediate the ends thereof, and is mounted thereon through a hub and bearings to enable jackshaft 40 to rotate with respect to clutch arm 36. Top sheave 42 is mounted on the upper end of jackshaft 40 for rotation thereof and lower sheave 44 is mounted on the lower end of jackshaft 40 for rotation therewith. Upper belt 46 extends around sheaves 34 and 42, as seen in FIG. 7, and as will be described in more detail hereinafter. Blade drive belt 48 extends around lower sheave 44 and extends around idler sheaves 28 and 30 as well as cutting blade sheaves 26.

Brake drum 50 is secured to lower sheave 44 for rotation therewith or may be directly attached to the lower end of jackshaft 40, for rotation therewith, if desired. A semi-circular brake band 52 is supported by engine frame 12 and partially extends around the forward end of brake drum 50.

Spring 54 has one thereof connected to clutch arm 36 at 56 and has its other end connected to the lower end of pivot arm 58 which is pivotally connected to engine frame 12 by pivot bolt 60. Control rod 62 has its lower end pivotally connected to the upper rearward end of pivot arm 58 and extends upwardly and rearwardly towards handle assembly 20. As seen in the drawings, control rod 62 has an adjustment turn buckle 64 provided thereon and has an offset portion 66 provided at its upper end. Blade engagement lever 68 includes an arm 72 extending therefrom which has its outer end pivotally connected to the upper end of control rod 62. Blade engagement lever 68 is operatively pivotally connected to the handle assembly 20 at 70 to enable the blade engagement lever to be pivotally moved between the blade engagement position illustrated by solid lines in FIG. 5 and the blade disengagement position illustrated by broken lines in FIG. 5.

Figure 6:
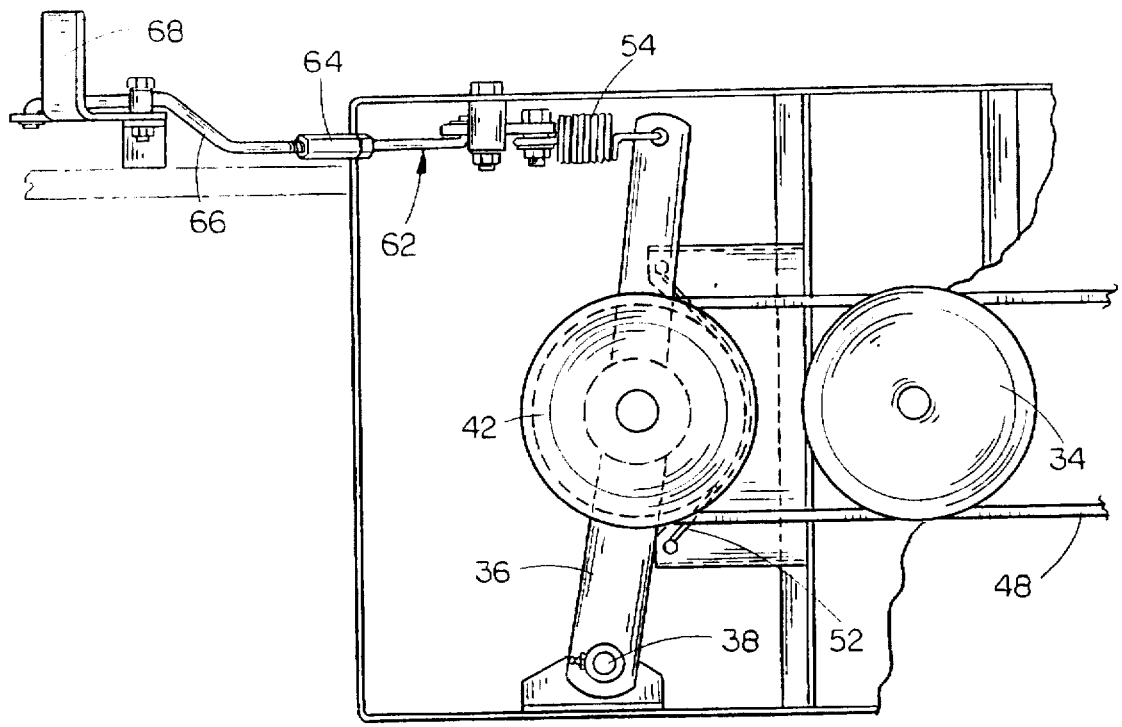
FIG. 6 is a partial top elevational view similar to FIG. 4 except that the clutch arm is in its first forward position.

When the blade engagement lever 68 is in its disengaged position, as illustrated in FIG. 6, spring 54 is relaxed. The spring-loaded idler sheave 30, which is in engagement with the blade drive belt 48, tensions the blade drive belt 48 so that the tension therein yieldably moves the clutch arm 36, and sheaves 42 and 44, forwardly with respect to the engine drive shaft 32 due to the forward pulling force on the lower sheave 44 by the belt 48. When the clutch arm 36 is in its forward or disengaged position, as illustrated in FIGS. 6 and 7, the belt 46 extends loosely around sheaves 34 and 42 so as to be in a non-driving condition. Inasmuch as the belt 46 is not being driven by the rotating sheave 34, when the clutch arm 36 is in its forward disengaged position, the drive belt 48 will not be driven. When the clutch arm 36 is in its forward disengaged position, brake drum 50 is in braking engagement with the brake band 52.

Figure 4:
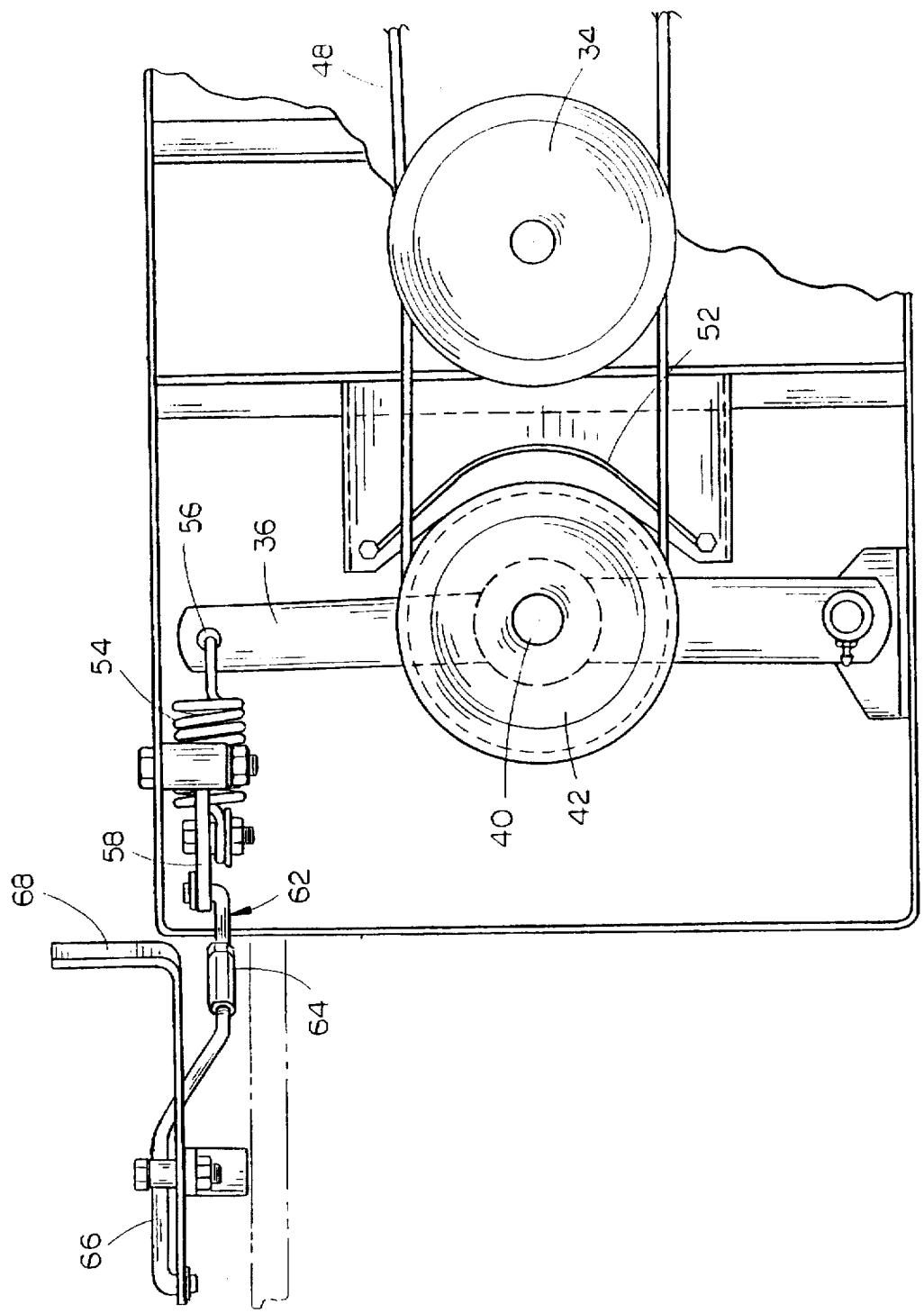
FIG. 4 is a partial top elevational view of the invention.

When it is desired to engage the cutting blades, the blade engagement lever 68 is pivotally moved from the blade disengagement position illustrated in FIG. 6 to the blade engagement position illustrated in FIG. 4. When the blade engagement lever 68 is moved to its engaged position, the linkage is locked "over center" to yieldably maintain the blade engagement lever in its engaged position.

The movement of the blade engagement lever 68 to its engaged position causes the pivot arm 58 to be pivotally moved from the position illustrated in FIG. 7 to the position illustrated in FIG. 4 so that spring 54 applies yieldable rearward force to the free end of the clutch arm 36, thereby moving jackshaft 40, upper sheave 42 and lower sheave 44 rearwardly with respect to drive shaft 32 so that belt 46 is brought into frictional driving engagement with the rotating drive sheave 34 so that jackshaft 40 will be rotated, thereby causing the rotation of lower sheave 44 and the rotation of the cutting blades by means of the blade drive belt 48.

When it is desired to disengage the rotating cutting blades, the blade engagement lever 68 is moved from the engaged position illustrated in FIG. 4 to the disengaged position illustrated in FIG. 6. The tension in the belt 48 causes the sheave 44, clutch arm 36, jackshaft 40 and top sheave 42 to be moved forwardly to loosen belt 46 so that sheave 34 will not drive sheave 42, as previously described. The forward movement of lower sheave 44 also causes brake drum 50 to be brought into frictional braking engagement with brake drum 52 to slow the rotation of the jackshaft 40 and sheave 44 which, in turn, slows the rotation of the blades 22.

Thus it can be seen that a novel blade drive clutch has been provided for a lawn mower and which may also include a brake, if desired. The design disclosed herein is more economical, reliable and durable than the devices of the prior art. Further, the blade drive clutch disclosed herein is well-suited for use when the mower deck 14 is of the floating type or moves vertically relative to the rear engine frame inasmuch as the misalignment angle of the belt 48 is substantially less than in prior art configurations due to the fact that the jackshaft 40 is located rearwardly of the engine drive sheave 34; therefore, the distance between the lower sheave 44 and the drive sheaves 26 and/or idlers 28 and 30 is greater than in the prior art devices. Thus it can be seen that the invention accomplishes at least all of its stated objectives.

I claim:

1. A self-propelled lawn mower, comprising:

a frame having a forward end, a rearward end, and opposite sides;

a mower deck at the forward end of said frame which house a blade assembly containing one or more rotatable cutting blades;

each of said cutting blades being mounted on a vertically disposed, rotatable spindle having a horizontally disposed sheave mounted thereon;

an engine mounted on said frame rearwardly of said mower deck and having a vertically disposed, rotatable drive shaft extending downwardly therefrom;

a horizontally disposed drive sheave mounted on said drive shaft below said engine;

a substantially horizontally disposed, elongated clutch arm having one end pivoted about a vertical axis, to said frame at one side thereof and extending towards said other side of said frame;

said clutch arm being positioned rearwardly of said engine drive shaft and drive sheave;

said clutch arm, being pivotally movable, from a first forward position to a second rearward position;

a vertically disposed, rotatable jackshaft mounted on said clutch arm intermediate the ends thereof and having upper and lower ends;

an upper sheave mounted on the upper end of said jackshaft;

a lower sheave mounted on the lower end of said jackshaft;

an upper belt extending around and connecting said drive sheave and said upper sheave;

said upper belt normally extending loosely around said drive sheave and said upper sheave in a non-driving relationship when said clutch arm is in said first forward position;

a blade drive belt extending around and connecting said lower sheave and said cutting blade sheaves;

a spring-loaded idler sheave in engagement with said blade drive belt for tensioning said blade drive belt so that the tension in said blade drive belt yieldably urges said lower sheave forwardly and yieldably urges said clutch arm towards said first forward position;

and a handle assembly having a manually operated control linkage operatively connected to said clutch arm for selectively moving said clutch arm from said first forward position to said second rearward position, thereby moving said jackshaft and said upper and lower sheaves rearwardly, with respect to said drive shaft, so that said upper belt is brought into frictional driving engagement with said drive sheave and said top sheave to cause said lower sheave to drive said blade drive belt and said cutting blades.

2. The lawn mower of claim 1 wherein said control linkage includes a pivot arm pivotally connected, about a horizontal axis, to said frame rearwardly of said clutch arm, a spring interconnecting said pivot arm and said other end of said clutch arm, an elongated member having one end pivotally connected to said pivot arm for pivoting said pivot arm between first and second positions, said elongated member extending upwardly and rearwardly towards said handle assembly, a blade engagement lever pivotally secured to said handle assembly about a horizontal axis, the other end of said elongated member being pivotally secured to a blade engagement lever, said blade engagement lever being pivotally movable from a blade engagement position to a blade disengagement position.

3. The lawn mower of claim 2 wherein said blade engagement lever causes said elongated member to be moved upwardly and rearwardly, when said blade engagement lever is moved to said blade engagement position, to thereby cause said pivot arm to move from said first position to said second position which causes said spring to move said clutch arm to said second rearward position.

4. The lawn mower of claim 2 further including means for selectively maintaining said blade engagement lever in said blade engagement position.

5. The lawn mower of claim 1 further including a brake drum operatively secured to said lower sheave for rotation therewith, and a stationary brake band positioned forwardly of said brake drum but normally spaced therefrom when said clutch arm is in said second rearward position, said brake drum being moved forwardly into frictional braking engagement with said brake band when said clutch arm is moved from said second rearward position to said first forward position.

* * * * *